US010108846B2

(12) United States Patent
Look et al.

(10) Patent No.: US 10,108,846 B2
(45) Date of Patent: Oct. 23, 2018

(54) SCANNING FOR MATERIALS AND SCALE INFORMATION

(71) Applicant: Autodesk, Inc., San Rafael, CA (US)

(72) Inventors: Douglas Look, San Francisco, CA (US); Patricia Anne Vrobel, Portland, OR (US); James Awe, Santa Rosa, CA (US); Negar Arabani, Mill Valley, CA (US); Mark Thomas Davis, Mill Valley, CA (US)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 15/282,138

(22) Filed: Sep. 30, 2016

(65) Prior Publication Data

US 2018/0096193 A1   Apr. 5, 2018

(51) Int. Cl.
*G06K 9/00* (2006.01)
*G06K 9/18* (2006.01)
*G06K 9/20* (2006.01)
*H04N 5/225* (2006.01)

(52) U.S. Cl.
CPC ..... *G06K 9/00208* (2013.01); *G06K 9/00671* (2013.01); *G06K 9/18* (2013.01); *G06K 9/20* (2013.01); *H04N 5/2256* (2013.01); *G06K 2209/27* (2013.01)

(58) Field of Classification Search
CPC .. G06K 9/00208; G06K 9/00671; G06K 9/18; G06K 9/20
See application file for complete search history.

(56) References Cited

U.S. PATENT DOCUMENTS

| 6,449,384 | B2 | 9/2002 | Laumeyer et al. | |
|---|---|---|---|---|
| 9,524,589 | B1* | 12/2016 | Goenka | G06T 19/006 |
| 2005/0044050 | A1* | 2/2005 | Hendrickson | G06Q 30/0283 705/400 |
| 2006/0056732 | A1* | 3/2006 | Holmes | G06T 7/0006 382/286 |
| 2013/0293580 | A1* | 11/2013 | Spivack | G06Q 30/0643 345/633 |

OTHER PUBLICATIONS

Unknown author, "Computer-aided design—Wikipedia, the free encyclopedia," (Jun. 21, 2016) [online] (retrieved from https://en.wikipedia.org/wiki/Computer-aided_design), 9 pages.
Unknown author, "Global Positioning System—Wikipedia, the free encyclopedia," (Jun. 21, 2016) [online] (retrieved from https://en.wikipedia.org/wiki/Global_Positioning_System), 28 pages.
(Continued)

*Primary Examiner* — Gregory M Desire
(74) *Attorney, Agent, or Firm* — Fish & Richardson P.C.

(57) ABSTRACT

Methods, systems, and apparatus, including medium-encoded computer program products, facilitate determining information about an object included in an image. In one aspect, a method includes: identifying an image; identifying a specific object included in the image; identifying data associated with the image; determining both a dimension of the specific object and a construction material of the specific object using the identified data; and outputting the dimension and the construction material of the specific object.

19 Claims, 5 Drawing Sheets

(56) References Cited

OTHER PUBLICATIONS

Unknown author, "Outline of object recognition—Wikipedia, the free encyclopedia," (Jun. 21, 2016) [online] (retrieved from https://en.wikipedia.org/wiki/Outline_of_object_recognition), 7 pages.
Unknown author, "QR code—Wikipedia, the free encyclopedia," (Jun. 21, 2016) [online] (retrieved from https://en.wikipedia.org/wiki/QR_code), 17 pages.

* cited by examiner

SCANNING FOR MATERIALS AND SCALE INFORMATION

BACKGROUND

This specification relates to determining information about an object included in an image.

Object recognition algorithms can be used to identify one or more objects included in an image. For example, appearance-based, feature-based, genetic, or other types of algorithms can be used. An object recognition algorithm can use matching, learning, and/or pattern recognition techniques. A predetermined object model can be used during object recognition. Object recognition techniques can be used to identify objects in still images or in video content items.

SUMMARY

This specification describes technologies relating to determining information about an object included in an image.

In general, one or more aspects of the subject matter described in this specification can be embodied in one or more methods that include identifying an image; identifying a specific object included in the image; identifying data associated with the image; determining both a dimension of the specific object and a construction material of the specific object using the identified data; and outputting the dimension and the construction material of the specific object.

For example, one or more additional aspects of the subject matter described in this specification can be embodied in one or more systems that include one or more computer storage media having instructions stored thereon; and one or more data processing apparatus configured to execute the instructions to perform operations including: (i) identifying an image; (ii) identifying a specific object included in the image; (iii) identifying data associated with the image; (iv) determining both a dimension of the specific object and a construction material of the specific object using the identified data; and (v) outputting the dimension and the construction material of the specific object.

For example, one or more additional aspects of the subject matter described in this specification can be embodied in computer storage medium having instructions stored thereon that cause data processing apparatus to perform operations comprising: (i) identifying an image; (ii) identifying a specific object included in the image; (iii) identifying data associated with the image; (iv) determining both a dimension of the specific object and a construction material of the specific object using the identified data; and (v) outputting the dimension and the construction material of the specific object.

These and other implementations can each optionally include one or more of the following features. Identifying the image can include capturing the image. Identifying the data associated with the image can occur upon the capturing of the image. A product corresponding to the specific object can be identified and a selectable product label for the product can be added to a display of the image. Outputting can include displaying material, cost, and dimension information in response to a selection of the selectable product label. Identifying the image can include identifying a previously-captured image. The image can be a frame of a video content item. Identifying the data associated with the image can include identifying one or more other objects included in the image. Determining the dimension and the construction material of the specific object can include determining at least one of the dimension or the construction material of the specific object based on a spatial relationship between the specific object and the one or more other objects. Determining at least one of the dimension or the construction material of the specific object can include: identifying an object type for at least one of the one or more other objects; identifying one or more known dimensions of the at least one other object with the identified object type; determining the dimension of the specific object based on the one or more known dimensions of the at least one other object and the spatial relationship; identifying a set of possible construction materials for the specific object based on the spatial relationship; and pattern matching image data for the specific object with the set of possible construction materials to determine the construction material of the specific object. Identifying the data associated with the image can include: identifying a location for the specific object based on positioning data stored with the image upon capture; and retrieving dimension and material information from a data repository based on the identified location. Identifying the data associated with the image can include identifying a symbol or code in the image, and determining the dimension and construction material comprises using the code to retrieve dimension and material information from a data repository. The symbol or code can be embedded within the specific object. An appearance of the symbol or code on the specific object can be triggered by a flash of a camera that captures the image.

Particular embodiments of the subject matter described in this specification can be implemented to realize one or more of the following advantages. A dimension (e.g., scale) and/or a construction material can be determined for an object included in an image based on data associated with other objects included in the image. A user viewing an image of a product can select a product label included in the image to view additional information about the product.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

An image processor can determine information about an object included in an image based on data that is included in the image. For example, the data can be based on the presence of one or more other objects or a code or symbol included in the image. One or more dimensions and/or a construction material of the object can be determined based on the data included in the image.

Figure 1:
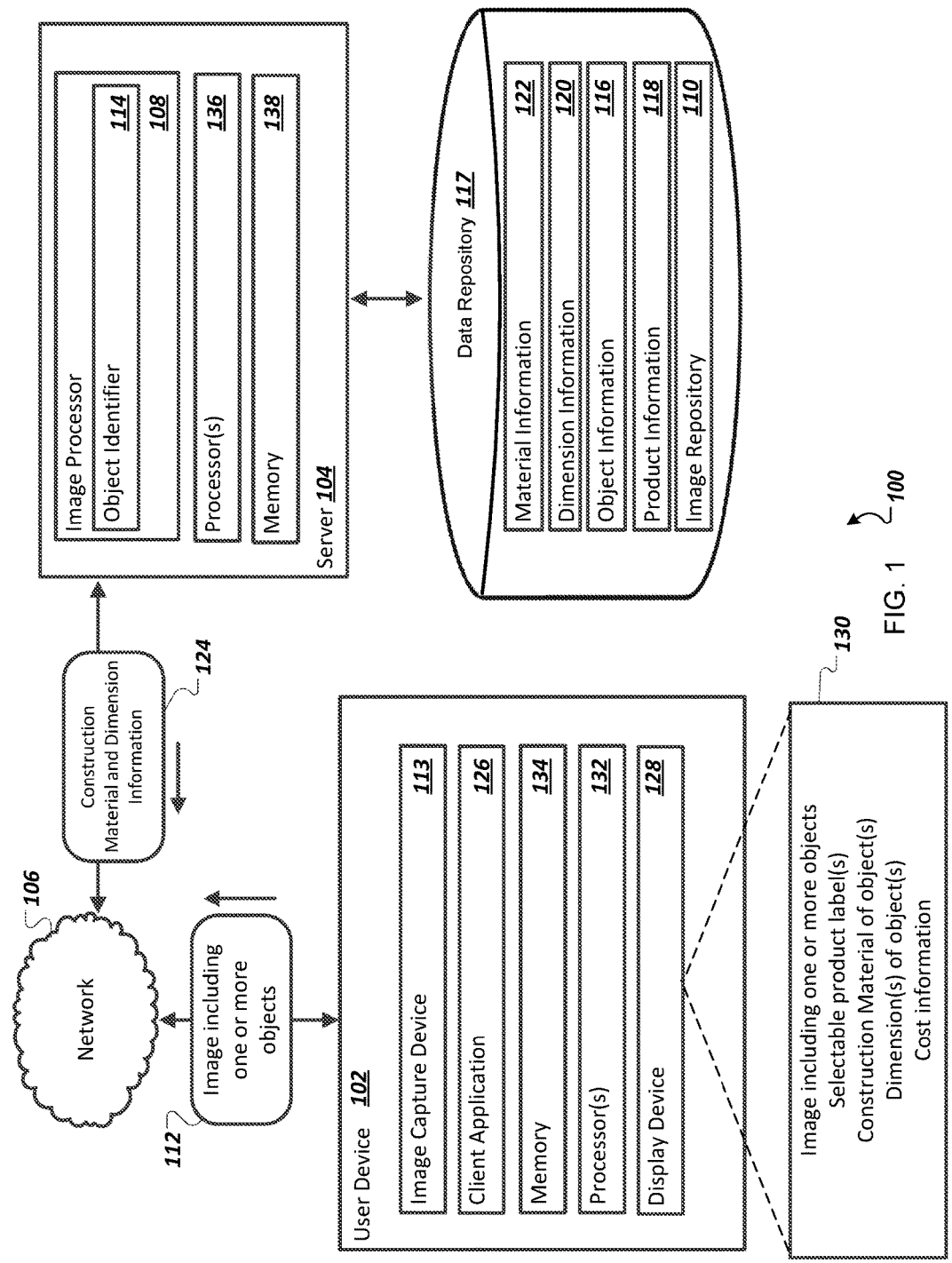
FIG. 1 illustrates an example of a system for determining information associated with an object.

FIG. 1 illustrates an example of a system 100 or determining information associated with an object. The system 100 includes a user device 102 and a server 104 communicating over a network 106. An image processor 108 included in the server 104 can identify an image. For example, the image processor 108 can identify an image from an image repository 110. As another example, the server 104 can receive an image 112 from the user device 102. The image 112 can include one or more objects. The image 112 can be an image that has been captured by an image capture device 113 that is included in or otherwise associated with the user device 102. The image 112 can be a frame included in a video content item.

An object identifier 114 associated with the image processor 108 can identify a specific object included in the image 112, using one or more object-recognition techniques. For example, the object identifier 114 can identify the specific object using object information 116 retrieved from a data repository 117 that describes known object types.

The image processor 108 can identify data associated with the image 112. For example, the image processor 108 can identify one or more of a product corresponding to the identified specific object (e.g., using product information 118), a symbol or code included in the image 112, one or more other objects included in the image, or geographic positioning data of the specific object stored with the image 112 upon capture.

The image processor 108 can determine both a dimension of the specific object and a construction material of the specific object using the data associated with the image. For example, the image processor 108 can retrieve dimension information 120 and material information 122 from the data repository 117 using the identified location of the specific object or the symbol or code included in the image 112.

As another example, and as described in more detail below, the image processor 108 can determine the dimension of the specific object based on a spatial relationship between the specific object and the one or more other objects. For example, the specific object can be adjacent to, included in, or otherwise spatially related to one or more of the other objects. The image processor 108 can identify an object type and one or more dimensions of one or more of the other objects using the object information 116. The image processor 108 can determine one or more dimensions of the specific object based on the one or more known dimensions of the one or more other objects and one or more spatial relationships with other objects. For example, the image processor 108 can determine a dimension of the specific object based on a known dimension of an object that includes, is adjacent to, or is included in the specific object.

As another example, the image processor 108 can identify a set of possible construction materials from the material information 122 for the specific object. The image processor 108 can pattern match image data for the specific object with the set of possible construction materials to determine the construction material of the specific object.

The server 104 can provide dimension and construction material information 124 for the specific object to the user device 202. A client application 126 can display the dimension and construction material information 124, on a display device 128, such as in association with a display of the image 112. For example, a user interface 130 displays the image 112 and the dimension and construction material information 124 received from the server 104. In some implementations, the user interface 130 includes a selectable product label that is configured to display the dimension and construction material information 124, cost information, other information about the specific object, or a combination of these, upon selection.

Although illustrated as being included in the server 104, in some implementations, the image processor 108 is included in the user device 102. The user device 102 can be any appropriate type of computing device, e.g., mobile phone, tablet computer, notebook computer, music player, e-book reader, laptop or desktop computer, PDA (personal digital assistant), smart phone, a server, or other stationary or portable device, that includes one or more processors 132 for executing program instructions, and a memory 134, e.g., random access memory (RAM). The user device 102 can include computer readable media (e.g., the memory 134, a disk drive, or other volatile or non-volatile storage medium) that store software applications, e.g., a browser or layout engine, an input device, e.g., a keyboard or mouse, a communication interface, and a display device 128. The server 104, which includes one or more processors 136 for executing program instructions, and a memory 138, e.g., RAM, can be implemented as one or more computer programs installed on one or more computers in one or more locations that are coupled to each other through the network 106.

The network 106 can be, for example, a wireless cellular network, a wireless local area network (WLAN) or Wi-Fi network, a mobile telephone network or other telecommunications network, a wired Ethernet network, a private network such as an intranet, a public network such as the Internet, or any appropriate combination of such networks.

Figure 2:
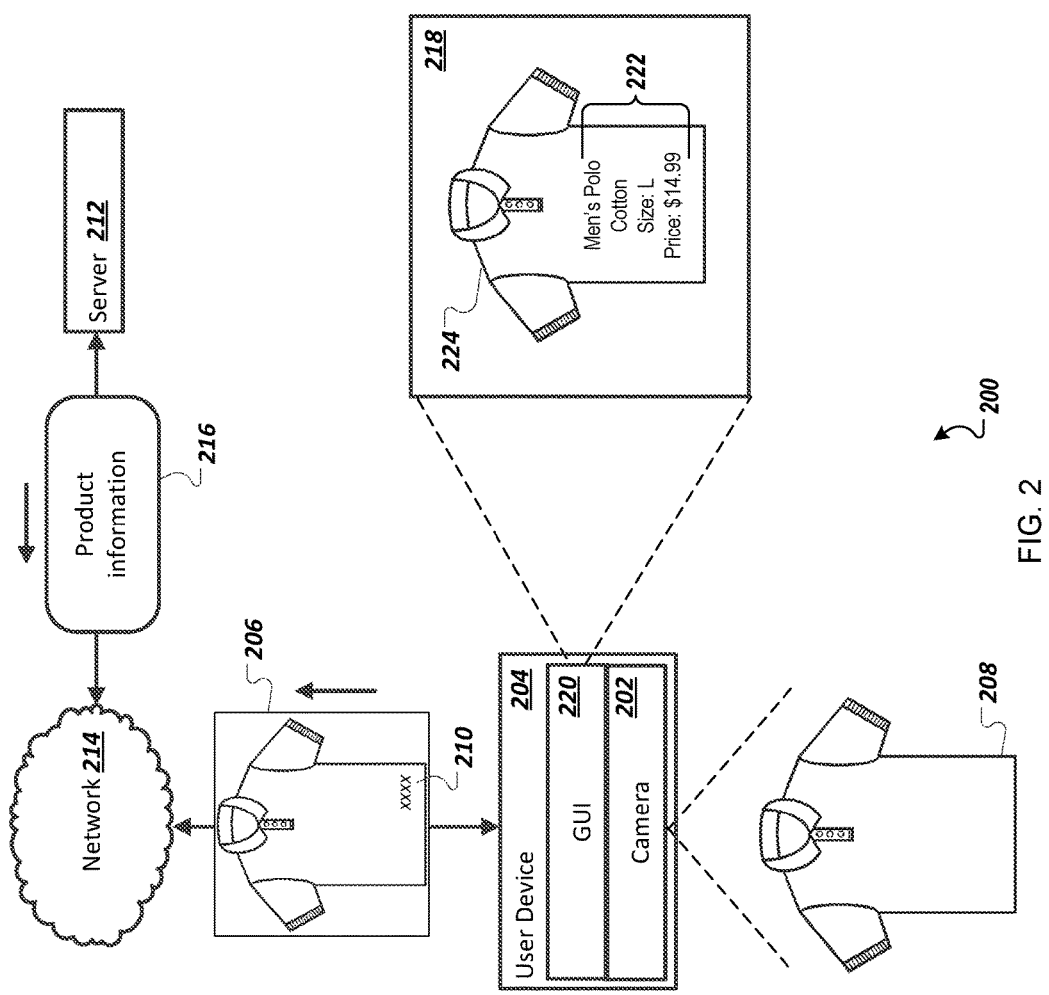
FIG. 2 illustrates an example of a system for viewing product information about a product included in an image.

FIG. 2 illustrates an example of a system 200 for viewing product information about a product included in an image. A user employs a camera 202 of a user device 204 to capture an image 206 of a shirt 208. An appearance of a code that is embedded within the fabric of the shirt 208 can be triggered by a flash of the camera 202, which can result in a code 210 appearing in the image 206. The image 206 (or in some implementations, the code 210) can be sent to a server 212 over a network 214. The server 212 can identify the code 210, determine product information related to the shirt 208 based on the code 210, and send determined product information 216 to the user device 202.

A product display 218 can be presented on a GUI (Graphical User Interface) 220 of the user device 204. The product display 218 can display the product information 216. For example, product information 222 displayed on an image 224 of the shirt 208 includes product type, construction material, size, and cost information.

Although the system 200 is illustrated as a client/server system, in some implementations, a repository of product information is stored on the user device 204 and an application associated with the product display 218 identifies the code 210 and retrieves the product information 222 associated with the code 210.

In some implementations, the product information 222 is included in the code 210 (e.g., the product information 222 can be embedded within the fabric of the shirt 208). The application can be configured to identify the embedded product information and to display the identified product information as an overlay on top of an image of the shirt 208 (e.g., in a manner as shown in the product display 218).

Figure 3:
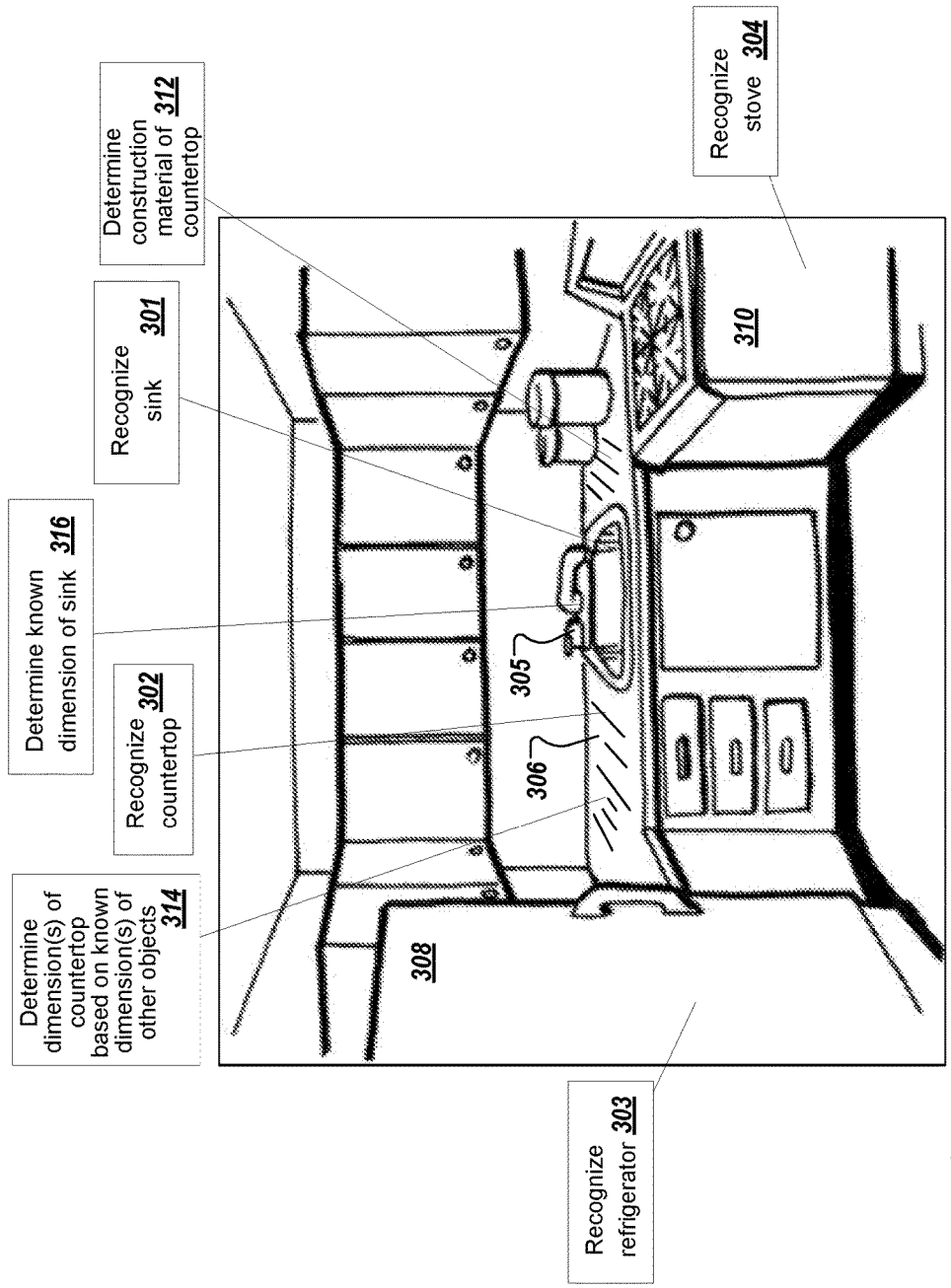
FIG. 3 illustrates processing of an example of an image.

FIG. 3 illustrates processing of an example of an image 300. The image 300 is an image of a kitchen. As respectively indicated by notes 301, 302, 303, and 304, an image processor can identify a sink 305, a countertop 306, a refrigerator 308, a stove 310 (and possibly other objects) in the image 300.

The image processor can, for example, determine that the countertop 306 is a countertop based on determining that the image 300 includes the refrigerator 308, the sink 305, and the stove 310, and based on one or more spatial relationships between the countertop 306 and other objects in the image 300. For example, the image processor can determine that the countertop 306 encloses the sink 305 and that the countertop 306 is adjacent to the refrigerator 308 and the stove 310.

As indicated by a note 312, the image processor can determine a construction material of the countertop 306 based on, for example, a pattern of the countertop 306. For example, based on determining that the countertop 306 is a countertop object type, the image processor can identify a set of possible construction materials for a countertop and pattern match image data for the countertop 306 with the set of possible construction materials to determine the construction material of the countertop 306.

As indicated by a note 314, the image processor can determine one or more dimensions of the countertop 306 based on known dimensions of one or more other objects included in the image 300. For example, as indicated by a note 316, the image processor can determine a known dimension for the sink 305 (e.g., 22×33 inches) and can determine one or more dimensions for the countertop 306 based on the known dimensions of the sink 305 and the spatial relationship between the sink 305 and the countertop 306. As another example, one or more dimensions of the countertop 306 can be determined based on one or more determined or estimated dimensions for the refrigerator 308 and/or the stove 310 (e.g., alternatively or in addition to the known dimension(s) of the sink 305).

Figure 4:
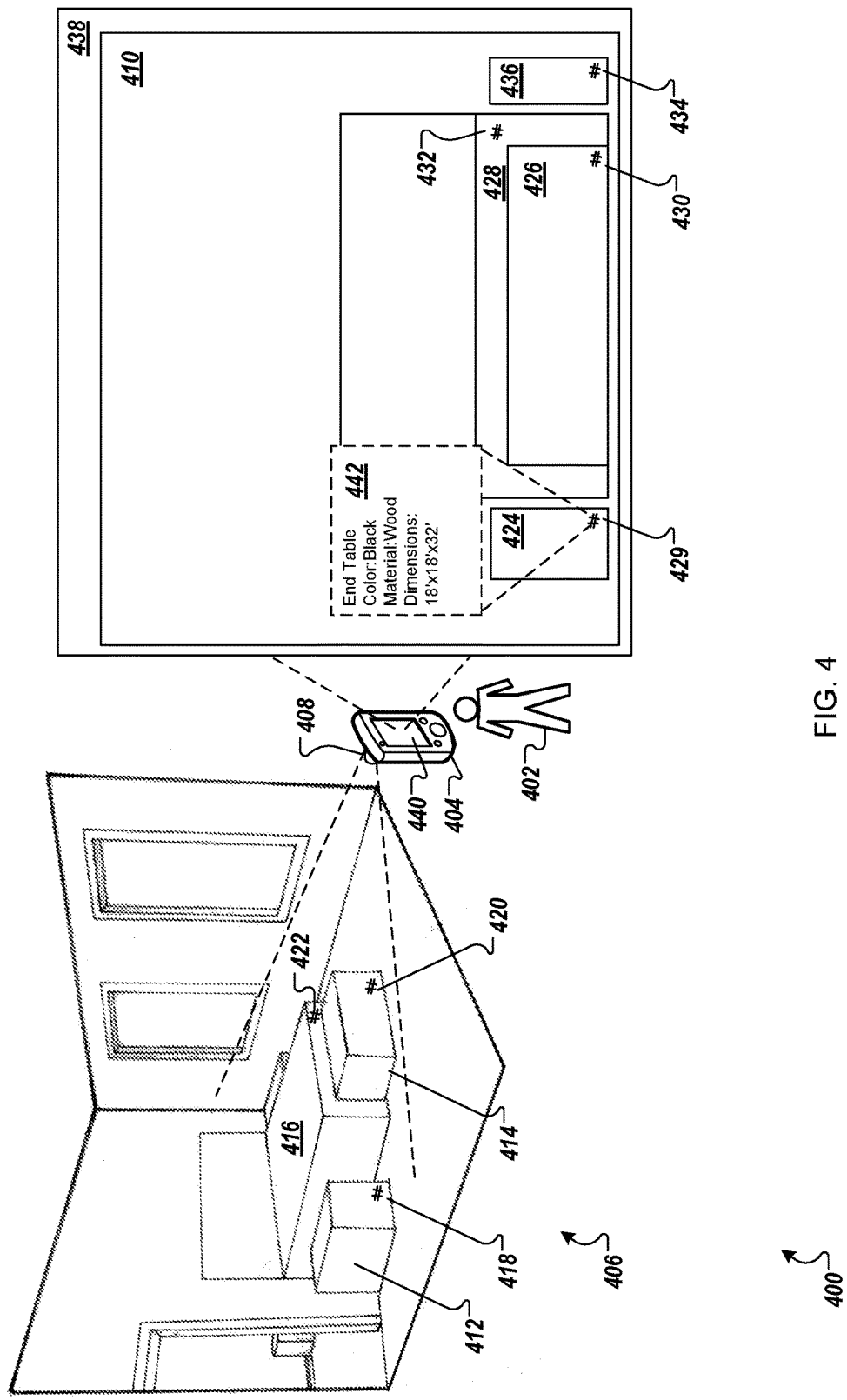
FIG. 4 illustrates an example of a system for viewing information about objects in an image.

FIG. 4 illustrates an example of a system 400 for viewing information about objects in an image. The system 400 includes a user device 404 that a user 402 employs to capture an image of, or to view an image of, a bedroom display 406 (e.g., at a furniture retail store). The user 402 can, for example, use a camera 408 associated with the user device 404 to capture an image 410 of the bedroom display 406. The bedroom display 406 includes furniture items that include an end table 412, an ottoman 414, and a bed 416. The end table 412, ottoman 414, and bed 416 respectively include codes 418, 420, and 422 that have been placed onto a respective furniture item.

The image 410 includes image portions 424, 426, and 428 corresponding to the end table 412, the ottoman 414, and the bed 416, respectively. Code image portions 429, 430, and 432 correspond to the codes 418, 420, and 422. A code image portion 434 is included in an image portion 436 of a second end table that is included in the bedroom display 406.

The image 410 can be displayed in an image application 438 presented on a display 440 of the user device 404. The image application 438 can display a previously captured image or an image as presently being captured by the camera 408 (e.g., the image 410 may or may not have been saved onto the user device 404 in long term storage). The image application 438 can process the image 410 and can recognize the code image portions 429, 430, 432, and 434. The image application 438 can be configured to enable user selection of the code image portions 429, 430, 432, and 434, and in response to user selection of a respective code image portion, display information related to a respective furniture item associated with the selected code image portion.

For example, in response to user selection of the code image portion 429, an overlay 442 can be displayed on top of the image 410. The overlay 442 displays information about the end table 412. For example, the overlay 442 displays an item type of end table, a material type of wood, a color of black, and dimensions of 18"×18"×32". Overlays displaying information relating to the ottoman 414, the bed 416, or the second end table can be displayed in response to respective selection of the code image portions 430, 432, or 434.

In some implementations, the codes 418, 420, and 422 are not displayed on respective furniture items and the image application 438 determines that the image 410 has been captured at a particular geographic location that matches the location of the bedroom display 406. In response to determining the location of the captured image 410, the image application 438 can retrieve and display information about the bedroom display 406 in the image application 438 in association with the display of the image 410, such as in one or more overlays such as the overlay 442.

For example, the image application 438 can be configured (e.g., upon the capturing of the image 410) to query a geographic position component (e.g., GPS (Global Positioning Satellite) receiver) included in the user device 404 for location information for the user device 404. The user device 404 can send the location information to a server (not shown). The server can match the received location information to a known, predefined location, and can identify product information associated with the known location. The server can send the product information to the user device 404. The image application 438 can, while displaying the image 410, display the received product information, such as in one or more overlays.

Figure 5:
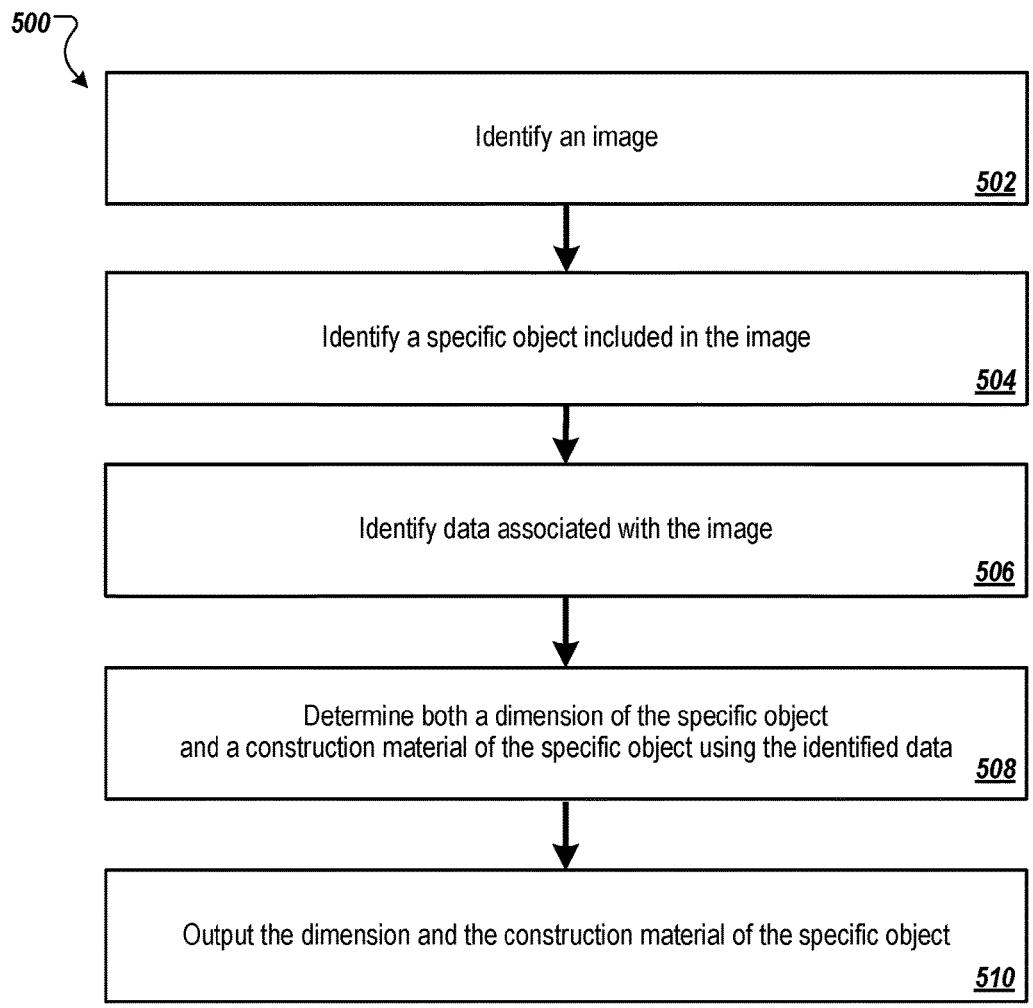
FIG. 5 shows an example of a flowchart of a process to determine a dimension and construction material of an object included in an image.

FIG. 5 shows a flowchart of an example of a process 500 to determine a dimension and construction material of an object included in an image. The various steps of the process 500 can be implemented in computer software and performed, for example, by one or more data processing apparatus (e.g., servers, personal computers, tablet computers, and so on).

An image is identified 502. For example, the image can be identified when the image is captured. As another example, a previously-captured image can be identified. For example, information indicating a selection of a previously-captured image can be received. The image can be a still image or a frame of a video content item.

A specific object included in the image is identified 504. The specific object can be an object that is distinct from other objects included in the image. The specific object can be identified using object recognition techniques.

Data associated with the image is identified 506. The data can be, for example, a symbol or code included in the image. The symbol or code can be embedded within the specific object, for example. As another example, one or more other objects included in the image can be identified. The one or more other objects can be different objects than the specific object, for example.

The data associated with the image can be identified when the image is captured. In some implementations, a location for the specific object is identified based on positioning data stored with the image upon capture (e.g., GPS data, wireless network data, or both). As another example, an appearance of the symbol or code can be triggered by a flash of a camera that captures the image. In some implementations, upon capture of the image, a product corresponding to the specific object is identified and a selectable product label for the product is added to a display of the image.

Both a dimension of the specific object and a construction material of the specific object are determined 508 using the identified data. For example, dimension and material information can be retrieved from a data repository based on the identified location of the specific object. As another example, the symbol or code can be used to retrieve dimension and/or construction material information for the specific object from the data repository.

As another example, at least one of the dimension or the construction material of the specific object can be identified based on a spatial relationship between the specific object and the one or more other objects. For example, the specific object can be adjacent to, included in, or otherwise spatially related to one or more of the other objects. An object type for one or more of the other objects can be identified and one or more known dimensions of one or more of the other objects with an identified object type can be identified. The dimension of the specific object can be determined based on the one or more known dimensions of the one or more other objects and one or more spatial relationships with other objects. For example, a dimension of the specific object can be determined based on a known dimension of an object that includes, is adjacent to, or is included in the specific object.

As yet another example, a set of possible construction materials for the specific object can be identified based on one or more of the spatial relationship between the specific object and another object, the object type of the specific object, or the object type of one or more of the other objects. Image data for the specific object can be pattern-matched with the set of possible construction materials to determine the construction material of the specific object.

The dimension and the construction material of the specific object are outputted 510. For example, the dimension and the construction material can be outputted in association with the displaying of the image. In some implementations, when the selectable product label has been added to a display of the image, material, cost, and dimension information is displayed in response to a selection of the selectable product label.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other.

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In addition, the actions recited in the claims can be performed in a different order and still achieve desirable results.

What is claimed is:

1. A method comprising:
    identifying an image;
    identifying a specific object included in the image;
    identifying data associated with the image;
    determining both a dimension of the specific object and a construction material of the specific object using the identified data; and
    outputting the dimension and the construction material of the specific object;
    wherein identifying the data associated with the image comprises identifying one or more other objects included in the image, and determining the dimension and the construction material of the specific object comprises determining at least one of the dimension or the construction material of the specific object based on a spatial relationship between the specific object and the one or more other objects.

2. The method of claim 1, wherein identifying the image includes capturing the image.

3. The method of claim 2, wherein identifying the data associated with the image occurs upon the capturing of the image, and the method further comprises:
    identifying a product corresponding to the specific object; and
    adding a selectable product label for the product to a display of the image;
    wherein the outputting comprises displaying material, cost, and dimension information in response to a selection of the selectable product label.

4. The method of claim 1, wherein identifying the image includes identifying a previously-captured image.

5. The method of claim 1, wherein the image is a frame of a video content item.

6. The method of claim 1, wherein determining at least one of the dimension or the construction material of the specific object comprises:
    identifying an object type for at least one of the one or more other objects;
    identifying one or more known dimensions of the at least one other object with the identified object type;
    determining the dimension of the specific object based on the one or more known dimensions of the at least one other object and the spatial relationship;
    identifying a set of possible construction materials for the specific object based on the spatial relationship; and
    pattern matching image data for the specific object with the set of possible construction materials to determine the construction material of the specific object.

7. The method of claim 1, wherein identifying the data associated with the image comprises:
    identifying a location for the specific object based on positioning data stored with the image upon capture; and
    retrieving dimension and material information from a data repository based on the identified location.

8. The method of claim 1, wherein identifying the data associated with the image comprises identifying a symbol or code in the image, and determining the dimension and construction material comprises using the code to retrieve dimension and material information from a data repository.

9. The method of claim 8, wherein the symbol or code is embedded within the specific object.

10. The method of claim 9, wherein an appearance of the symbol or code on the specific object is triggered by a flash of a camera that captures the image.

11. A computer storage medium having instructions stored thereon that cause data processing apparatus to perform operations comprising:
    identifying an image;
    identifying a specific object included in the image;
    identifying data associated with the image, wherein identifying the data associated with the image comprises identifying one or more other objects included in the image;

determining both a dimension of the specific object and a construction material of the specific object using the identified data, wherein determining the dimension and the construction material of the specific object comprises
  identifying an object type for at least one of the one or more other objects,
  identifying one or more known dimensions of the at least one other object with the identified object type,
  determining the dimension of the specific object based on the one or more known dimensions of the at least one other object and a spatial relationship between the specific object and the one or more other objects,
  identifying a set of possible construction materials for the specific object based on the spatial relationship, and
  pattern matching image data for the specific object with the set of possible construction materials to determine the construction material of the specific object; and
outputting the dimension and the construction material of the specific object.

12. The computer storage medium of claim 11, wherein identifying the image includes capturing the image.

13. The computer storage medium of claim 12, wherein identifying the data associated with the image occurs upon the capturing of the image, the operations further comprising:
  identifying a product corresponding to the specific object; and
  adding a selectable product label for the product to a display of the image;
  wherein the outputting comprises displaying material, cost, and dimension information in response to a selection of the selectable product label.

14. The computer storage medium of claim 11, wherein identifying the image includes identifying a previously-captured image.

15. The computer storage medium of claim 11, wherein the image is a frame of a video content item.

16. A system comprising:
  one or more computer storage media having instructions stored thereon; and
  one or more data processing apparatus configured to execute the instructions to perform operations comprising:
    identifying an image;
    identifying a specific object included in the image;
    identifying data associated with the image, wherein identifying the data associated with the image comprises identifying one or more other objects included in the image;
    determining both a dimension of the specific object and a construction material of the specific object using the identified data, wherein determining the dimension and the construction material of the specific object comprises
      identifying an object type for at least one of the one or more other objects,
      identifying one or more known dimensions of the at least one other object with the identified object type,
      determining the dimension of the specific object based on the one or more known dimensions of the at least one other object and a spatial relationship between the specific object and the one or more other objects,
      identifying a set of possible construction materials for the specific object based on the spatial relationship, and
      pattern matching image data for the specific object with the set of possible construction materials to determine the construction material of the specific object; and
    outputting the dimension and the construction material of the specific object.

17. The system of claim 16, wherein identifying the image includes capturing the image.

18. The system of claim 17, wherein identifying the data associated with the image occurs upon the capturing of the image, the operations further comprising:
  identifying a product corresponding to the specific object; and
  adding a selectable product label for the product to a display of the image;
  wherein the outputting comprises displaying material, cost, and dimension information in response to a selection of the selectable product label.

19. The system of claim 16, wherein identifying the image includes identifying a previously-captured image.

* * * * *